Dec. 6, 1966          J. KOLBE          3,290,055
VEHICLE SUSPENSION SYSTEM
Filed June 17, 1964          2 Sheets-Sheet 1
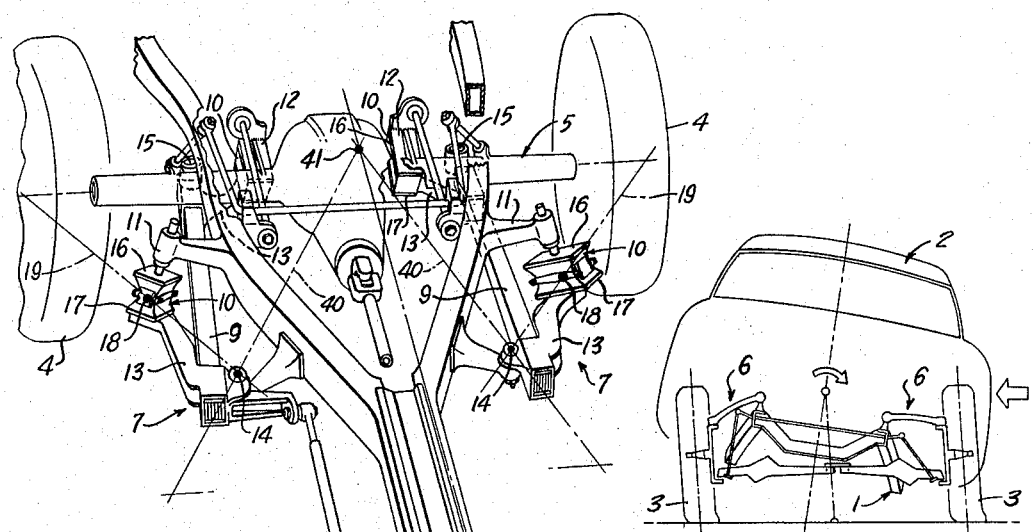
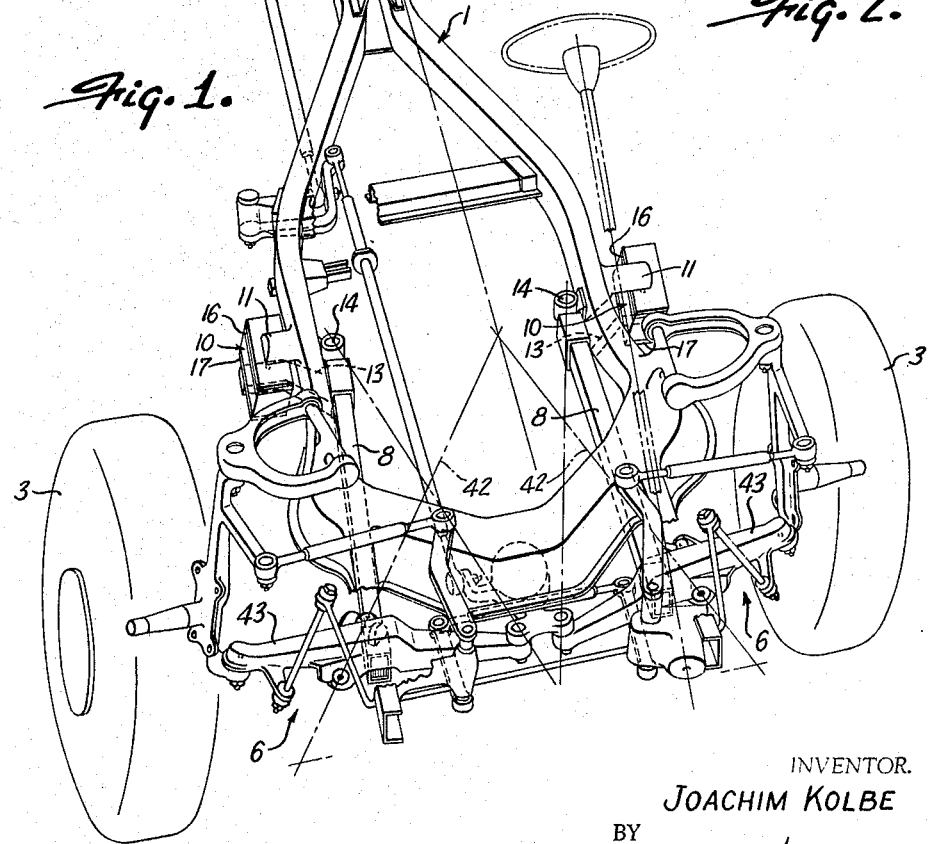
INVENTOR.
JOACHIM KOLBE
BY
*Andrus & Starke*
ATTORNEYS Dec. 6, 1966     J. KOLBE     3,290,055
VEHICLE SUSPENSION SYSTEM
Filed June 17, 1964     2 Sheets-Sheet 2

INVENTOR.
JOACHIM KOLBE
BY Andrus & Starke
ATTORNEYS

United States Patent Office 3,290,055
Patented Dec. 6, 1966

3,290,055
VEHICLE SUSPENSION SYSTEM
Joachim Kolbe, 5126 Haskell Ave., Encino, Calif.
Filed June 17, 1964, Ser. No. 375,736
6 Claims. (Cl. 280—112)

This invention relates to an improved vehicle suspension system of the type set forth in application Serial No. 252,017 filed January 15, 1963, now Patent No. 3,181,883, by the present applicant.

More particularly the improvement is based upon the discovery that by providing certain characteristics of the rubber cushion blocks employed, a wheel rate for normal straight ahead ride can be provided that corresponds favorably with present day passenger car standards, and at the same time a greater ease of banking is obtained.

Heretofore, when rubber cushion blocks of the type disclosed in the aforesaid application were employed, having a substantially uniform cross section throughout the length and width of the block, it was found that in order to provide the necessary grip areas for the top and bottom plates on the block and the necessary stability of the block for the given movements involved, the block was necessarily so large that the dynamic wheel rate was nearly twice the static wheel rate and thereby greater than that generally acceptable for present day passenger cars. Attempts to employ lower durometer rubber did not solve the problem.

The present improvement provides a stable block with support surfaces of substantial size and with an intermediate dimension of smaller area section than the support surfaces, which provides a greater ease of swivel action between the support plates and thereby reduces the dynamic wheel rate to more nearly approximate the static wheel rate, a construction more acceptable for present day passenger cars. At the same time, the improved construction provides less resistance to banking whereby banking is obtained more rapidly and a return to upright position is obtained with less delay.

The accompanying drawings illustrate the best mode presently contemplated of carrying out the invention.

In the drawings:

FIGURE 1 is a perspective, somewhat schematic view of a passenger car chassis employing the spring system of the invention;

FIG. 2 is a front elevation of a car, reduced in dimensions and showing the banking effect generally obtainable from the mounting system on a turn;

Figure 3:
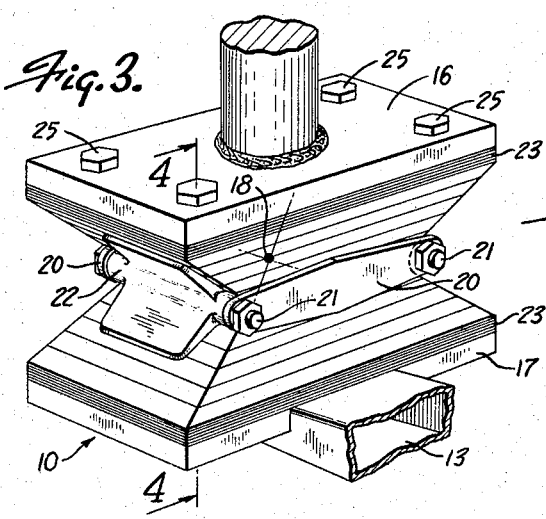
FIG. 3 is an enlarged perspective view of a cushion block employed in the system.

Referring to FIGS. 1 and 2, the passenger vehicle illustrated comprises a frame 1 which represents the vehicle superstructure carrying the vehicle body 2, a pair of independently mounted and steerable front wheels 3, a pair of rear drive wheels 4 carried at opposite ends of a rigid axle structure 5, a front wheel suspension 6 between the frame 1 and wheels 3, and a rear wheel suspension 7 between the frame 1 and axle structure 5.

The suspensions 6 and 7 are of the type more fully described and claimed in applicant's copending application referred to above. In general the suspensions 6 and 7 comprise roll banking arms which employ torsional springs 8 in the front and similar torsional springs 9 in the rear for resisting both relative vertical and lateral movements between the frame 1 and the corresponding wheels 3 and 4.

The geometry of the suspensions 6 and 7 is such as to provide a banking effect for the frame or superstructure during curve ride, in addition to the normal vertical cushion desired for ease of ride at all times, as more fully described and claimed in the foregoing copending application and more generally in earlier applications and patents therein identified.

For this purpose rubber blocks 10 are provided in each suspension between brackets 11 on the frame 1 where supported by the frame, and brackets 12 on the axle 5 where supported by the axle and corresponding lever arms 13. Each lever arm turns about an effective hinge axis comprising a fixed pivot point 14 on the corresponding supporting frame and a fixed pivot point 15 on the corresponding supporting axle, as the case may be. Each corresponding lever rigidly carries one corresponding end of the torsion spring 8 or 9. The rubber blocks 10 control the torsional stress and strain of springs 8 and 9, respectively and also the vertical deflection of the springs during the banking turn of the superstructure.

Each block 10 is disposed between a pair of support plates which are secured to the corresponding support surfaces of the block therebetween, the upper support plate 16 being rigidly carried by the bracket 11 on frame 1, or the bracket 12 on the axle 5, and the bottom support plate 17 being rigidly carried by the lever 13. The center 18 of the block 10 in each instance cooperates with the center of the pivot 14 to provide the oscillation hinge axis 19 for the corresponding banking arm, and since the center 18 is movable with deflections of the block resulting from relative movements between plates 16 and 17, the oscillation hinge axis 19 shifts accordingly with the desired banking action without undue stress on the parts.

Where the block 10 is of uniform length, width and thickness throughout, as illustrated in the copending application above identified, it has been found difficult to provide the desired ease of vertical springing of the superstructure and at the same time provide the necessary control of the banking action on curves.

According to the present invention the support surfaces of the block, gripped by the respective plates 16 and 17, are retained largely to lend stability to the block, and the intermediate dimensions of the block are reduced toward the center point 18 to give an increased swivel flexibility of the block in the central region and to thereby provide the desired ease of deformation in response to vertical springing forces on the corresponding torsion spring arms 8 and 9.

The determining factor for the dimensions of the support surfaces gripped by the plates 16 and 17, is stability under the range of deformation or deflection encountered in the maximum guiding movements required during banking and also during vertical springing of the superstructure. In this regard the block section located in height of the center 18 should always be well within the vertical projections of the boundaries of the two support surfaces.

The determining factors for the cross sectional area dimensions of the block in the central region for a given durometer of rubber are: (1) the load represented by the weight of the corresponding part of the superstructure, which limits the minimum area required; and (2) the need for keeping substantially all parts of the block in compression and avoiding any substantial regions of tension in the rubber during swiveling or other deformation of the block, which limits the maximum desirable area when employing a given size of support surface.

Figure 4:
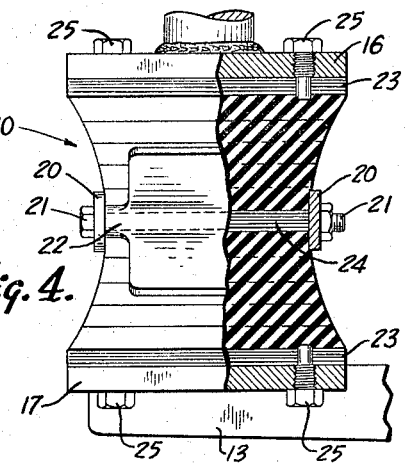
FIG. 4 is an end view with a portion broken away and in vertical transverse section taken on line 4—4 of FIG. 3.

The invention has been applied to a 1962 model "Chevrolet Impala" automobile, and in this application it was found that rubber blocks of the general construction illustrated in FIGS. 3 and 4, of rubber having a durometer of approximately 40 and with a support surface area of approximately 3 x 5 or 7 inches and a thickness of approximately 3½ inches when uncompressed, were very satisfactory. It is preferable to employ a rubber having the bounce characteristics of natural rubber, and most synthetic rubbers are lacking in this characteristic.

It was found however, that the softness of the rubber and the reduction in area of the block at the center tended to create an unstable condition by reason of the rubber deforming slowly to an off-center position, and not returning. Rubbers of higher durometer or less bounce generally avoid this difficulty but may not give the desirable soft ride characteristics desired for passenger automobiles.

In order to avoid the difficulty and enable the employment of a soft rubber the central part of the block is preferably reinforced as illustrated in FIGS. 3 and 4, against unstable lateral deflection. For this purpose a metal strap 20 is disposed longitudinally along each side of the block midway between plates 16 and 17. The straps 20 are secured in place by two end bolts 21 which join the corresponding ends of the straps to form a metal clamping device. Tightening of the bolts 12 draws the straps 20 together in pressure engagement with the rubber thereby applying an initial compression to the rubber. The bolts 21 lie in the central recesses at the ends of the block and generally press against the rubber and are preferably enclosed by distance holding tubes 22, which might form part of a control angle against unwanted rubber deformation.

The rubber block 10 is preferably molded in a single piece and should have internal reinforcement as illustrated in the copending application referred to above. Generally a piece of belting 23 is embedded in the rubber adjacent each of the support surfaces of the block, and a similar piece of belting 24 is embedded in the rubber in the central plane of the block intermediate the support surfaces.

The belting 23 and 24 reinforce the soft rubber against undesired deflection and provide means for securing the support plates 16 and 17 thereto. For this purpose lag screws 25 are employed to secure the plates in place. Additionally, the rubber may be bonded to plates 16 and 17 by any suitable bonding means for that purpose.

Figure 5:
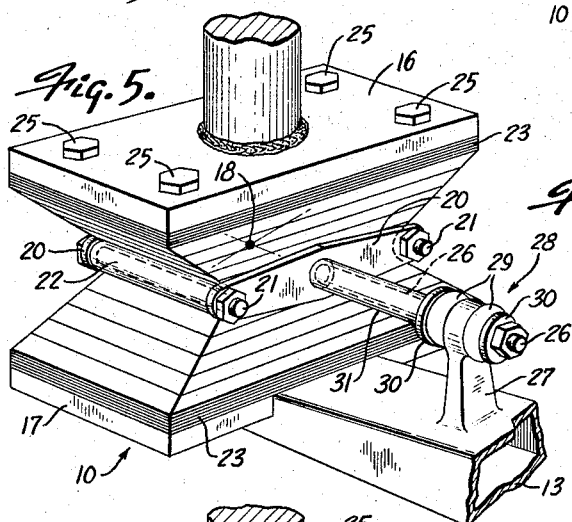
FIG. 5 is a perspective schematic view of a cushion and cushion support arm showing a modified form of construction.
Figure 6:
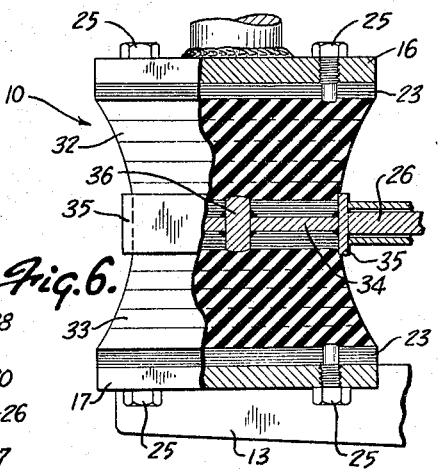
FIG. 6 is a detail partial end view and transverse section of a cushion showing a further modified form of construction.
Figure 7:
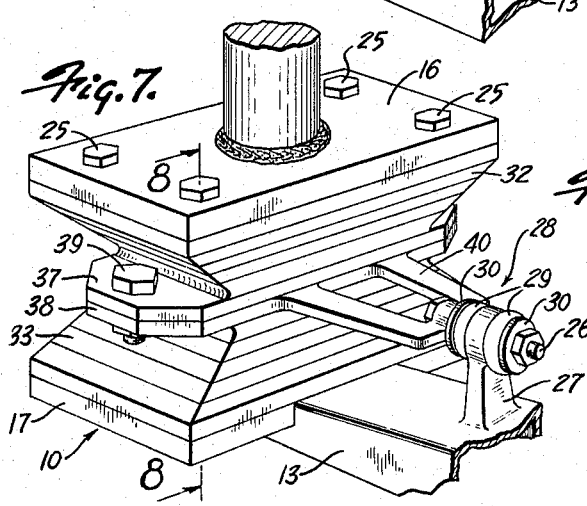
FIG. 7 is a schematic perspective view of a cushion showing a further form of construction.
Figure 8:
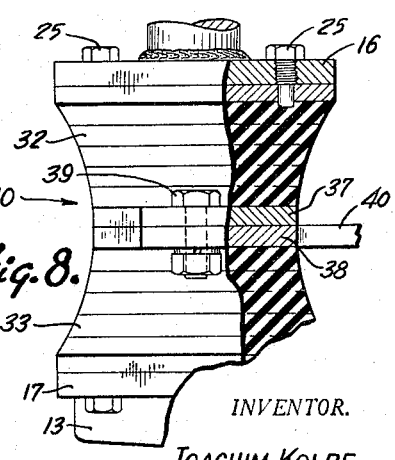
FIG. 8 is a partial end view with a portion broken away and in generally vertical transverse section taken on line 8 of FIG. 7.

The modified block construction illustrated in FIG. 5, but which is as applicable to the construction of FIGS. 3 and 4, as well as to that of FIGS. 6 to 8 provides for anchor means for the central clamping device described in FIGS. 3 and 4 which prevents undue lateral shifting of the clamping device relative to plates 16 and 17 with a possible collapse of the block.

For this purpose a rod 26 is secured to the metal strap 20 and extends laterally therefrom perpendicular to said strap in a direction toward the turning point located along the corresponding banking hinge line. A bracket 27 extending from either plate 16 or 17, or from the frame 1 or arm 13, is connected to the free end of rod 26 by a shackle type rubber pivot 28 comprising rubber rings 29 and enclosing washers 30 and located by the distance tube 31. This pivot compensates for limited relative movements between the rod 26 and bracket 27 while preventing undue longitudinal movement of the rod.

The modified block construction illustrated in FIG. 6 illustrates an additional feature.

The block of FIG. 6 is molded of two separate halves 32 and 33 joined centrally by a metal plate 34 which is interlocked therewith by peripheral flanges 35 and a plurality of dowel-like pins 36 on the plate and which is also preferably bonded to the rubber. The flanges 35 confine the rubber and prevent displacement of the rubber adjacent the plate 34 and the pins 36 enter corresponding holes in the rubber.

The halves 32 and 33 when assembled with plate 34 constitute a block having the same general shape as the block of FIGS. 3 and 4, and substantially the same characteristics and functions.

The modified block construction illustrated in FIGS. 7 and 8 illustrates a simplified block-built-up where reliable bonding between rubber and metal is available for the central section of the block. Two metal plates 37 and 38 each are bonded to one of the corresponding half blocks 32 and 33 and bolted together by bolts 39. One of the plates carries by means of a laterally extending arm 40 the anchoring device pivot comprising the elements 26 to 31 described for FIG. 5.

Returning to FIG. 1 and comparing the same with the construction illustrated in the copending application referred to above, it will be noted that the present construction avoids the need for power assist interlocking means between the front and rear pairs of banking arms.

Each of the rear banking arms illustrated employ two blocks 10. The block at the front end of each arm cooperates with ball joint 14 to create an effective banking hinge axis illustrated by line 40 which extends upwardly and backwardly to meet the corresponding line of the other arm of the pair at a central point 41 generally in the height of the center of mass of the superstructure and to the rear thereof. The block at the rear end of each arm cooperates with the ball joint 15 carrying the rear end of the torsion spring on axle 5 to maintain the torsion spring in the desired stressed condition for statically and dynamically supporting the superstructure. This construction is made possible by reason of the rigid axle 5 joining the outer ends of the banking arms.

Each of the front banking arms illustrated employ only a single block 10 located between the bracket 11 on the frame 1 and the lever arm 13 on the rear end of the torsion spring 8. The front end of the torsion spring 8 is carried by the inclined banking hinge 42 on the lower arm 43 of the independent front wheel suspension.

The construction illustrated is generally that which has been applied to a present model of "Chevrolet" passenger car with excellent results.

Various modes of carrying out the invention are contemplated as being within the scope of the following claims particularly pointing out and distinctly claiming the subject matter which is regarded as the invention.

I claim:

1. In a vehicle suspension system of the class described, a roll banking arm comprising a torsion spring and connected at one end to a member of the vehicle superstructure and at the other end to a member of the effective road support for the vehicle, at least one of said connections comprising a universally movable joint between the torsion spring and the corresponding member, a laterally disposed lever arm connected to the end of the torsion spring, and a rubber block retained under compression between said lever arm and said corresponding member to control the torsional load on said spring while relieving the spring of undesirable bending stresses, said rubber block being confined between a support plate carried by said lever arm and a support plate carried by said corresponding member and having the intermediate portion of the block of reduced dimensions.

2. The construction of claim 1 in which the effective road support member is a rigid rear axle housing, and in which both ends of said torsion spring are connected as specified in the same manner.

3. The construction of claim 1 in which the end connection for said torsion spring opposite said universally movable joint connection comprises an inclined banking hinge.

4. The construction of claim 1 in which a peripheral metal member reinforces said reduced intermediate portion of the block.

5. The construction of claim 4 and means to limit any lateral movement of said peripheral metal member.

6. In a vehicle suspension system of the class described, a roll banking arm comprising a torsion spring and connected at one end to a member of the vehicle superstructure and at the other end to a member of the effective road support for the vehicle, at least one of said connections comprising a universally movable joint between the torsion spring and the corresponding member, a laterally disposed lever arm connected to the end of the torsion spring, a rubber block retained under compression between said lever arm and said corresponding member to control the torsional load on said spring while relieving the spring of undesirable bending stresses, said rubber block being confined between a support plate carried by said lever arm and a support plate carried by said corresponding member and having the intermediate portion of the block of reduced dimensions, a peripheral metal member reinforcing said reduced intermediate portion of said block, and shackle means connecting said peripheral metal member and the corresponding member to which the rubber block connects the torsion spring to limit lateral movement of said peripheral metal member.

References Cited by the Examiner

UNITED STATES PATENTS

| | | | |
|---|---|---|---|
| 1,761,967 | 6/1930 | Blackmore | 267—30 |
| 1,834,502 | 12/1931 | Smith | 267—30 |
| 2,612,370 | 9/1952 | Eger | 267—63 |
| 2,699,934 | 1/1955 | Boschi | 267—63 |
| 2,713,483 | 6/1955 | Tillou | 267—63 X |
| 2,820,646 | 1/1958 | Kolbe | 280—112 |
| 3,080,159 | 3/1963 | Orner | 267—63 X |
| 3,081,993 | 3/1963 | Wallerstein | 267—63 X |

FOREIGN PATENTS

| | | |
|---|---|---|
| 1,316,567 | 12/1962 | France. |
| 268,314 | 9/1927 | Great Britain. |
| 464,621 | 4/1937 | Great Britain. |

BENJAMIN HERSH, *Primary Examiner.*

A. HARRY LEVY, *Examiner.*

W. A. MARCONTELL, M. S. SALES,
*Assistant Examiners.*